United States Patent [19]

Sugaya et al.

[11] Patent Number: 5,247,512
[45] Date of Patent: Sep. 21, 1993

[54] ECHO CANCELLER

[75] Inventors: Fumiaki Sugaya, Tokyo; Yotaro Yatsuzuka, Kanagawa, both of Japan

[73] Assignee: Kokusai Denshin Denwa Co., Ltd., Tokyo, Japan

[21] Appl. No.: 925,681

[22] Filed: Aug. 7, 1992

[30] Foreign Application Priority Data

Aug. 14, 1991 [JP] Japan .................. 3-228616

[51] Int. Cl.$^5$ .................. H04L 5/14; H04B 3/23
[52] U.S. Cl. .................. 370/32.1; 379/410; 379/406
[58] Field of Search .................. 370/32, 32.1; 379/406, 379/410, 411

[56] References Cited

U.S. PATENT DOCUMENTS

| 4,805,215 | 2/1989 | Miller | 370/32.1 |
| 5,029,204 | 7/1991 | Shenoi et al. | 370/32.1 |
| 5,148,427 | 9/1992 | Buttle et al. | 370/32.1 |

Primary Examiner—Wellington Chin
Attorney, Agent, or Firm—Nikaido, Marmelstein, Murray & Oram

[57] ABSTRACT

In an echo canceller having PCM interfaces used in a PCM telephone circuit, an echo estimator (65) is coupled with a receive path through a linear code converter (632) for measuring a linear receive input signal, and a subtracter (7) is inserted after a linear code converter (631) in a transmit path for cancelling an echo component in a linear transmit input signal. The same procedure as that in a conventional echo canceller is performed in a divergent situation in the echo estimator (65) in which a large step gain is assigned, and in a convergent situation in the echo estimator (65) in which a relatively small step gain is assigned, a non-linear quantization processor (27,271) is inserted between the subtracter (7) and the echo estimator (65). The non-linear quantization processor (27,271) produces a new echo estimate containing a quantization noise, based on an echo estimate which is derived from the echo estimator (65). The new echo estimate can cancel not only the echo but also the quantization noise in the linear transmit input signal. The echo canceller having the non-linear quantization processor (27,271) can achieve a high echo return loss enhancement even for a multi-linked PCM channel.

7 Claims, 9 Drawing Sheets

ECHO CANCELLER

BACKGROUND OF THE INVENTION

The present invention relates to an echo canceller for a PCM telephone channel, and/or an acoustic channel having PCM interfaces in tele-conferences.

In a telephone channel having a four-wire long distance PCM trunk, hybrid circuits are connected for 2wire-4wire conversion. The hybrid circuits at each end of a call interface two-wire subscriber loops to the four-wire long distance PCM trunk. The near-end echo of a far-end talker on the transmit path through the hybrid circuit is returned to the talker who perceives it as an echo.

FIG. 1 shows the basic structure of a conventional echo canceller with 64 kbit/s PCM interfaces for cancelling the echo in a PCM telephone channel. The input and output signals of the echo canceller (1) are assumed to be digitized with either 8-bit $\mu$- or A-law PCM and are processed digitally. The 8-bit PCM transmit input signal Sin at a transmit input port (5) is returned as the near-end echo over the echo path including at least a PCM coder (61) and a PCM decoder (62), which corresponds to the circuit from a receive output port (3) to the transmit input port (5) through a hybrid circuit (4). The 8-bit PCM receive output signal Rout from the port (3) is decoded to an analog signal through the PCM decoder (62). The hybrid circuit (4) transmits the analog signal through a port (15) to the near-end talker. A part of the analog signal at the hybrid circuit (4) is transmitted as an echo and is encoded through the PCM coder (61) in the transmit path. The conventional echo canceller (1) synthesizes a replica of the near-end echo by an echo estimator (6) and suppresses the echo by subtracting this replica at a subtracter (7) from the linear transmit input signal, which is converted from the 8-bit PCM transmit input signal Sin through a linear code converter (631). The residual echo derived as the output of the subtracter (7) is converted to a 8-bit PCM code through a non-linear code converter (64) to be transmitted from the transmit output port (8) of the echo canceller (1) either directly or after being processed by a non-linear unit like a center clipper.

In the echo estimator (6) which comprises an adaptive digital transversal filter having a finite impulse response (FIR), the filter coefficients are adaptively updated so as to minimize the level of the residual echo either at every sample time or at every sample interval. A double talk detector (13) and a low level detector (14) are provided for detecting the double talk situation between the near- and far-end talkers and for detecting the linear receive input signal having a low level so as to stop the updating of the filter coefficients, respectively. In the double talk detector (13), the residual echo supplied by the subtracter (7) may also be used instead of the linear transmit input signal.

FIG. 2 shows the functional structure of the conventional echo canceller (1) in which the detailed configuration of the echo estimator (6) is given. The echo estimator (6) comprises an X register (9) which stores the linear receive input signal derived from a linear code converter (632), an H register (10) which stores the filter coefficients corresponding to the impulse response of the adaptive filter, a convolution circuit (11) which generates an echo estimate (the replica of the linear transmit input signal) at the convolution circuit (11) by using the signal stored in the X register (9) and the filter coefficients in the H register (10), and an adaptation control processor (12) which updates the filter coefficients stored in the H register (10) so as to minimize the level of the residual echo derived from the subtracter (7).

Typical adaptation algorithms for updating the filter coefficients by both the residual echo and the linear receive input signal are Least Mean Square (LMS) and normalized LMS. Coefficients updating by the normalized LMS algorithm is assumed hereafter. A step gain for the coefficient updating in the adaptation control processor (12), which corresponds to a convergence speed of the adaptive filter, is chosen according to the outputs of the double talk and low level detectors (13,14).

In the adaptation control processor (12), the filter coefficients are normally updated by using the residual echo Re through a port (121) and the linear receive input signal through a port (120). When a double talk situation is detected in the double talk detector (13), a control signal is output through a port (122) to the adaptation control processor (12) for inhibiting the coefficient updating during double talking (constraining the step gain to zero). When the low level detector (14) detects that the level of the linear receive input signal is low, a control signal is output through a port (123) to the adaptation control processor (12) to constrain the step gain to zero during the detected period. Accordingly, the coefficients in the H register (10) can be protected from diverging due to the double talk or channel noise in the transmit path. If the coefficients in the H register (10) diverge, a highly inaccurate echo estimate might be generated, resulting in abrupt increase of the level of the residual echo.

The X register (9) stores N samples of the linear receive input signal from the n-th sampling index to the (n-(N−1)-th sampling index in X(n), X(n−1), . . . , X(n-(N−1)). The coefficients of the transversal filter having N taps are also stored in the H register (10). The i-th coefficient is given by H(i)|n at the n-th sampling index, where i varies from 0 to N−1. Through the convolution circuit (11), the filter output y(n) is given as the echo estimate at a port (74) by;

$$y(n) = \sum_{i=0}^{N-1} X(n - i) * H(i)|n. \quad [1]$$

The residual echo Re(n) at the n-th sampling index is also given by;

$$Re(n) = SinL(n) - y(n), \quad [2]$$

where SinL(n) is the linear transmit input signal derived from the linear code converter (631). It always contains the quantization noise induced by PCM codecs in the echo path. The echo estimator (6) cannot estimate the quantization noise produced by the nonlinear process in the echo path, and the residual echo Re(n) accordingly contains the quantization noise. To minimize the level of Re(n), the coefficients in the H register (10) are updated by the normalized LMS algorithm given by;

$$H(i)|n + 1 = H(i)|n + \Delta H(i)|n, \quad [3]$$
$$= H(i)|n + g * Re(n) * X(n - i)/ \quad [4]$$

-continued $$\left( \sum_{j=0}^{N-1} x(n-j) \cdot X(n-j) \right),$$

where i is the i-th tap position varying from 0 to N−1, ΔH(i)|n is the adjustment component at the n-th sampling index, and g is a constant referred to as a step gain having a value in the range 0 to 2.

In the case of an echo canceller having PCM interfaces so as to connect it with the PCM telephone channel, the quantization noise induced by the non-linear process of the PCM codecs in the echo path degrades performance of the echo cancellation, since the quantization noise in the linear transmit input signal is independent of the linear receive input signal and cannot be estimated by the echo estimator (6) which uses only the linear processing by the FIR filter. The available number of levels in the linear transmit input signal containing the quantization noise is only 256. On the other hand, the number of levels in the echo estimate is 65536 for 16-bit processing in the echo estimator (6). This also means that it is almost impossible for the residual echo to become precisely zero, and that echo cancellation performance is limited by the amount of quantization noise in the transmit input signal due at least to the PCM coder (61) and the linear code converter (631). This degradation cannot be avoided by using only the linear processes in a conventional echo canceller.

In a multi-linked PCM telephone channel, PCM codecs are inserted after the PCM decoder (62) and/or before the PCM coder (61) in the echo path. The tandem connection of the PCM codecs produces a large quantization noise relative to the number of PCM codecs. Thus, echo cancellation performance degrades gradually due to the PCM tandem connection.

In the above circumstances, no previous echo canceller was able to provide sufficiently high performance if the quantization noise existed. This invention however provides a new echo canceller which can resolve these problems.

SUMMARY OF THE INVENTION

It is an object, therefore, of the present invention to overcome the disadvantages and limitations of a conventional echo canceller.

It is also an object of the present invention to provide an echo canceller which provides high and rapid echo cancellation for an echo path having a PCM quantization noise.

The above and other objects are attained by an echo canceller comprising; an echo estimator (6) for synthesizing a replica of the linear transmit input signal; a non-linear quantization processor (27) for generating a new echo estimate containing a quantization noise by quantizing the echo estimate which is derived from the echo estimator (6); and a subtracter (7) so as to obtain a residual echo being sent to the far-end by subtracting the new echo estimate at a first input of the subtracter (7) from the linear transmit input signal at a second input of the subtracter (7). The non-linear quantization processor (27) can provide the new echo estimate which has the same value as that of the linear transmit input signal having the same quantization noise or is very close to it, resulting in effective cancellation of both the echo and the quantization noise. Rapid and high cancellation is also achieved in an echo canceller by using a non-linear quantization processor (27) in which an optimum echo estimate giving a minimum level of the residual echo is chosen among a plurality of candidates having a quantization noise derived from the echo estimate.

BRIEF DESCRIPTION OF THE DRAWINGS

The foregoing and other objects, features, and attendant advantages of the present invention will be better understood by means of the following descriptions and accompanying drawings wherein.

DESCRIPTION OF THE PREFERRED EMBODIMENTS

It is assumed that input and output signals of the echo cancelers are in 8-bit PCM form, and the echo cancelers handle digital signals.

Embodiment 1

Figure 3:
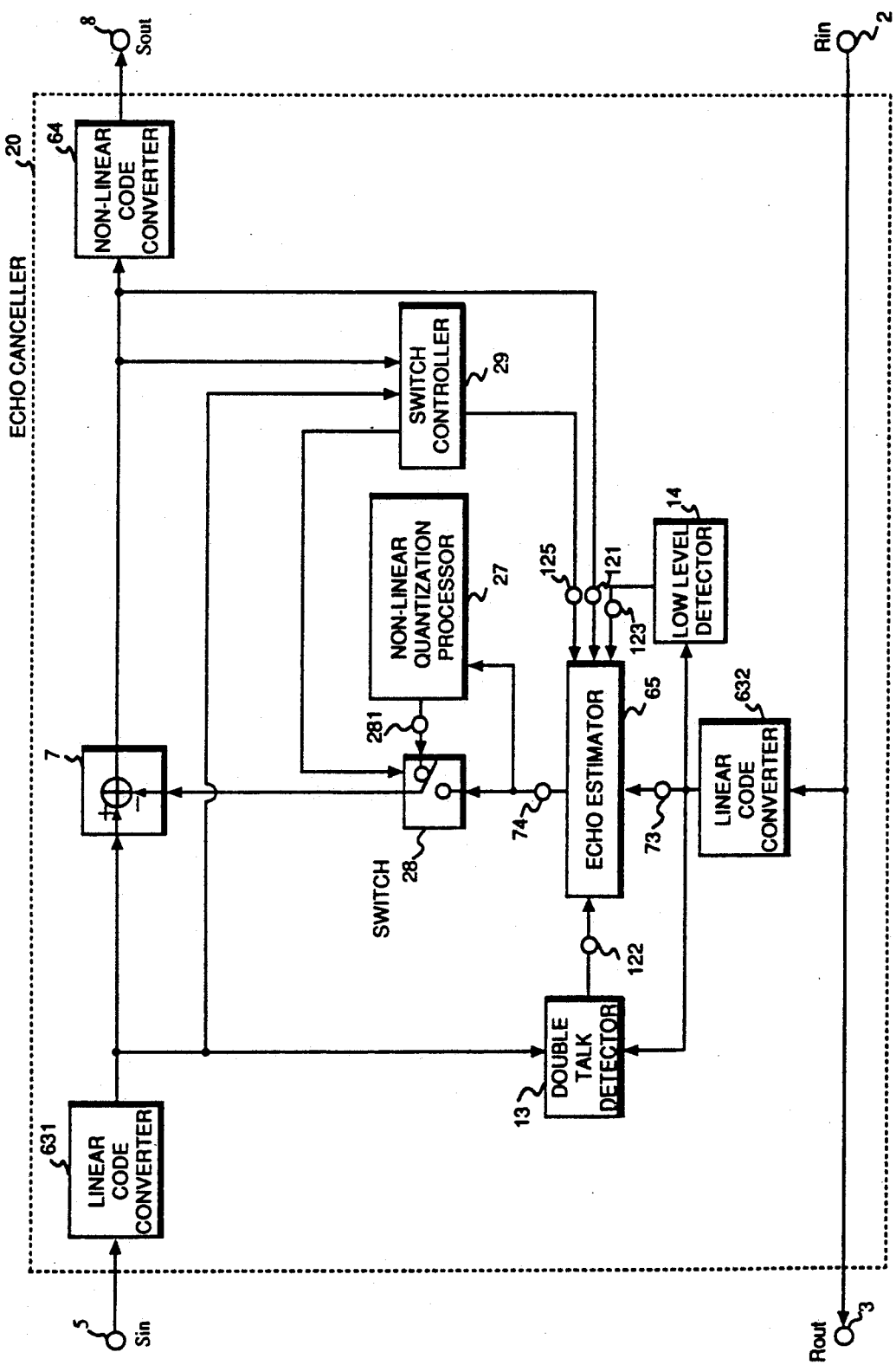
FIG. 3 is a functional configuration of an echo canceller (20) according to the present invention.

In a first embodiment of the present invention, an echo canceler (20) having PCM interfaces in FIG. 3 can be effectively applied to an echo path having a PCM link. The echo canceler (20) comprises at least: an echo estimator (65) for synthesizing an echo estimate from the linear receive input signal; a non-linear quantization processor (27) for generating a new echo estimate containing a quantization noise for the echo estimate; a subtracter (7) for obtaining a residual echo sent to the far-end; a switch (28) for connecting either the output of the echo estimator (65) or the output of the non-linear quantization processor (27) with the subtracter (7) so as to subtract the output at a first input of the subtracter (7) from the linear transmit input signal at a second input of the subtracter (7); and a switch controller (29) for controlling both the switch (28) and a step gain in the echo estimator (65), according to the convergence/divergence state in the echo estimator (65) which is determined by the switch controller (29).

Two processing modes are provided, that is, a linear processing mode and a non-linear processing mode. The processing mode is chosen by the switch controller (29), according to the convergence/divergence state of the echo estimator (65). The non-linear processing mode is chosen to be judged convergent when the level of the residual echo is smaller than that of the linear transmit input signal by at least a pre-determined threshold. In other cases, the linear processing mode is chosen. When the switch controller (29) judges the echo estimator (65) to be convergent according to the result of the comparison in level with the residual echo and the linear transmit input signal, the switch controller (29) selects the non-linear processing mode and then controls the switch (28) so as to connect the non-linear quantization processor (27) to the subtracter (7). In the non-linear quantization processor (27), the echo estimate from the echo estimator (65) is converted into a PCM code and then is inverse-converted again to a linear code having a quantization noise. The non-linear quantization processor (27) can provide a new echo estimate which has the same value as that of the linear transmit input signal including the quantization noise or a value very close to it. The output of the non-linear quantization processor (27) is then supplied through the switch (28) to the first input of the subtracter (7) so as to cancel the echo and the quantization noise in the linear transmit input signal at the second input of the subtracter (7). The step gain is also set to a small value so as to obtain a more accurate echo estimate in the echo estimator (65), resulting in generation of a precise quantization noise.

In the linear processing mode selected by the switch controller (29) due to divergence in the echo estimator (65), the output of the echo estimator (65) is directly supplied to the subtracter (7) through the switch (28) so as to obtain the residual echo as in the conventional echo canceler. The step gain is also set to be a large value to achieve rapid convergence in the echo estimator (65). The divergent echo estimator (65) cannot provide an echo estimate which is sufficiently accurate for adding an appropriate amount of quantization noise so as to reduce the quantization noise in the linear transmit input signal. The non-linear processor is therefore bypassed by controlling the switch (28) in this mode.

In the switch controller (28), the power of the linear transmit input signal and the power of the residual echo are calculated to be compared so as to judge the convergence/divergence state in the echo estimator (65) and select either the non-linear or linear modes. In the initial stage of the echo canceler (20), the linear processing mode is selected due to divergence. After judgement of convergence, the switch controller (28) selects the non-linear processing mode to ultimately cancel the quantization noise in the linear transmit input signal.

Figure 1:
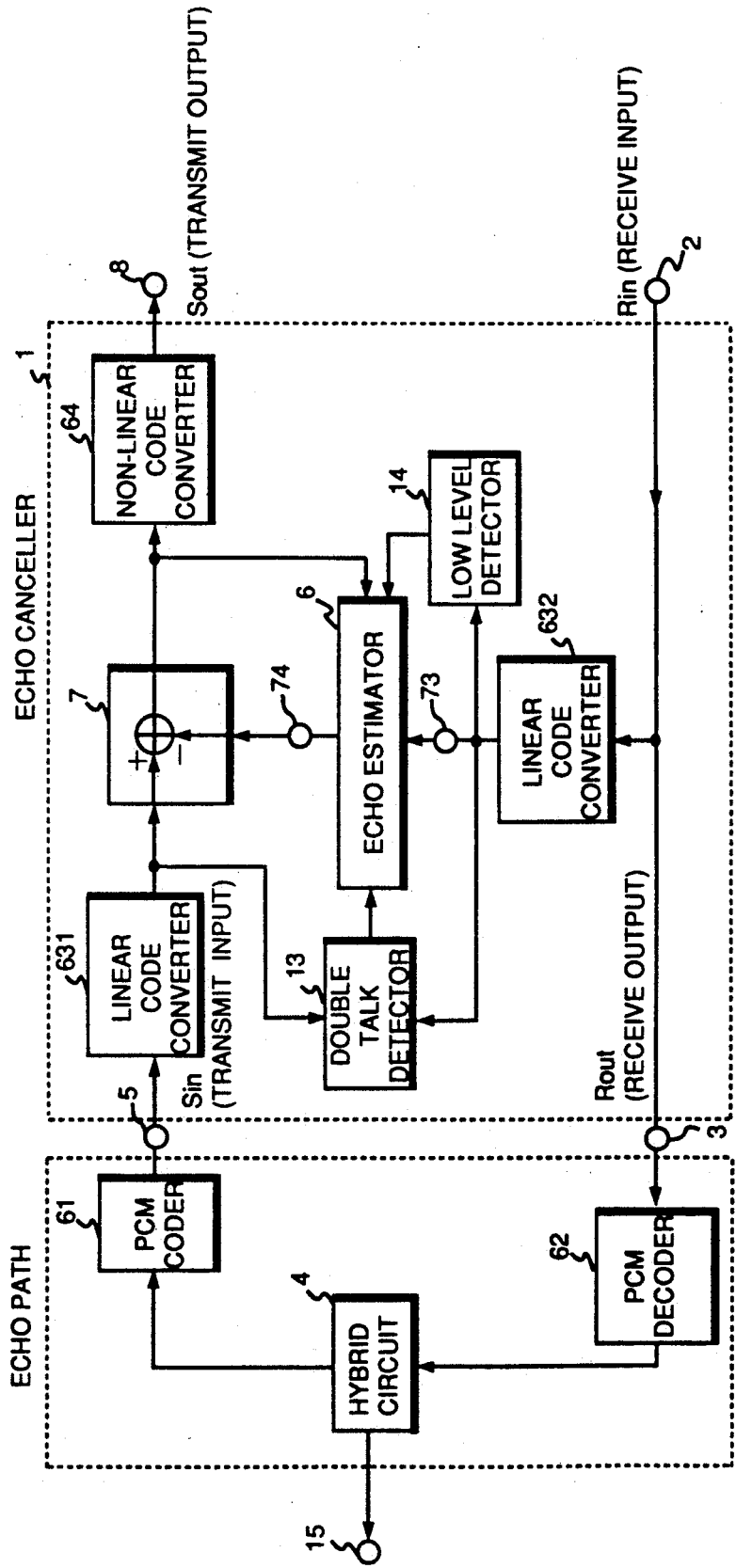
FIG. 1 is a basic structure of a conventional echo canceller (1) for a PCM telephone channel.
Figure 2:
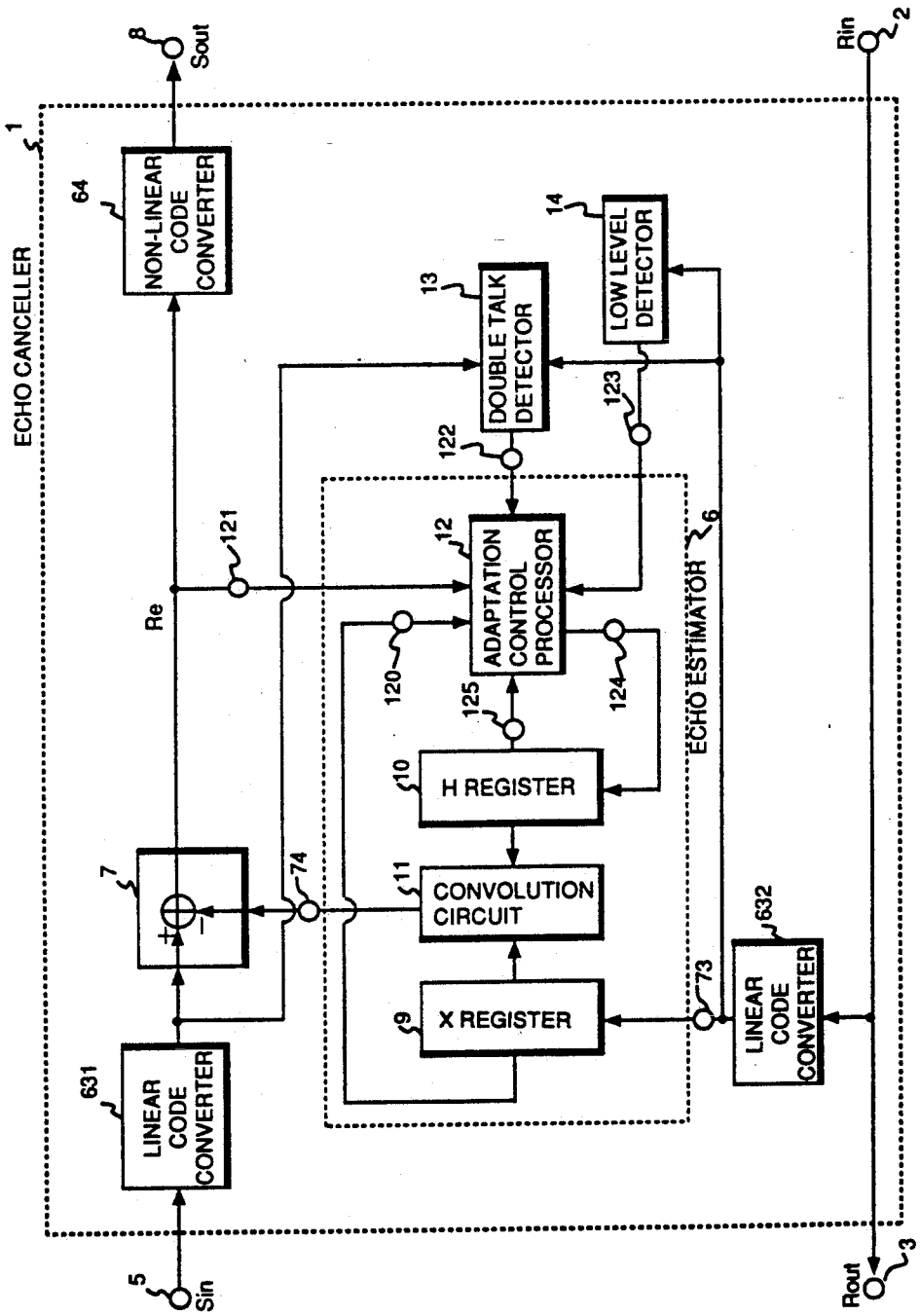
FIG. 2 is a functional configuration of the conventional echo canceller (1)
Figure 4:
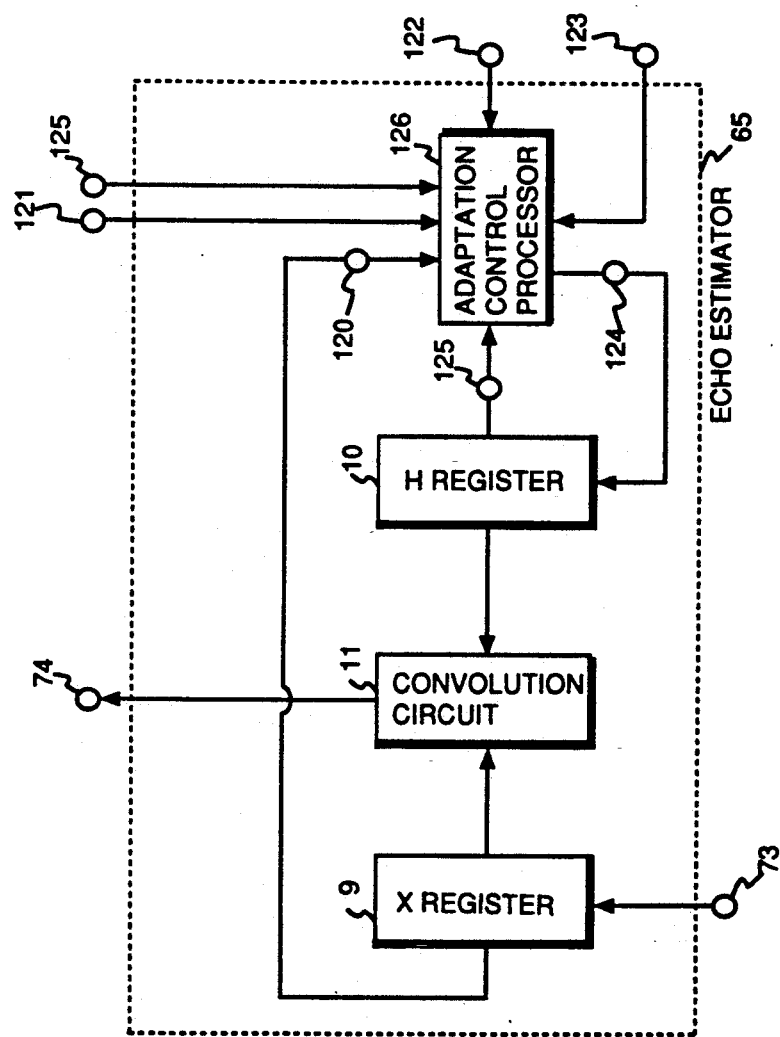
FIG. 4 is a functional configuration of an echo estimator (65)

FIG. 4 shows the configuration of the echo estimator (65) which has a similar configuration to that of the echo estimator (6) in the conventional echo canceler (1) shown in FIG. 2. An adaptation control processor (126) is slightly different from that of (12) in FIG. 2. The step gain in the adaptation control processor (126) is selected by the control signal through a port (125) from the switch controller (29), depending on the processing modes.

When the double talk situation is detected in a double talk detector (13), the step gain is constrained to be zero regardless of the mode in the control signal through a port (122). There is almost no effect of the non-linear quantization processor (27) during double talking, though it remains connected with the subtracter (7). Of course, the non-linear quantization processor (27) may also be bypassed in the double talk situation.

When a low level detector (14) detects that the linear receive input signal is low, the step gain is also constrained to be zero or a small value, regardless of the mode in the control signal through the port (122).

The non-linear quantization processor (27) can provide a new echo estimate which has the same value as that of the linear transmit input signal having the same quantization noise or is very close to it, resulting in effective cancellation of both the echo and the quantization noise in the convergent situation of the echo estimator (65). In the divergent situation, the present echo canceler provides the same cancellation performance as that of the conventional echo canceler.

Embodiment 2

Figure 5:
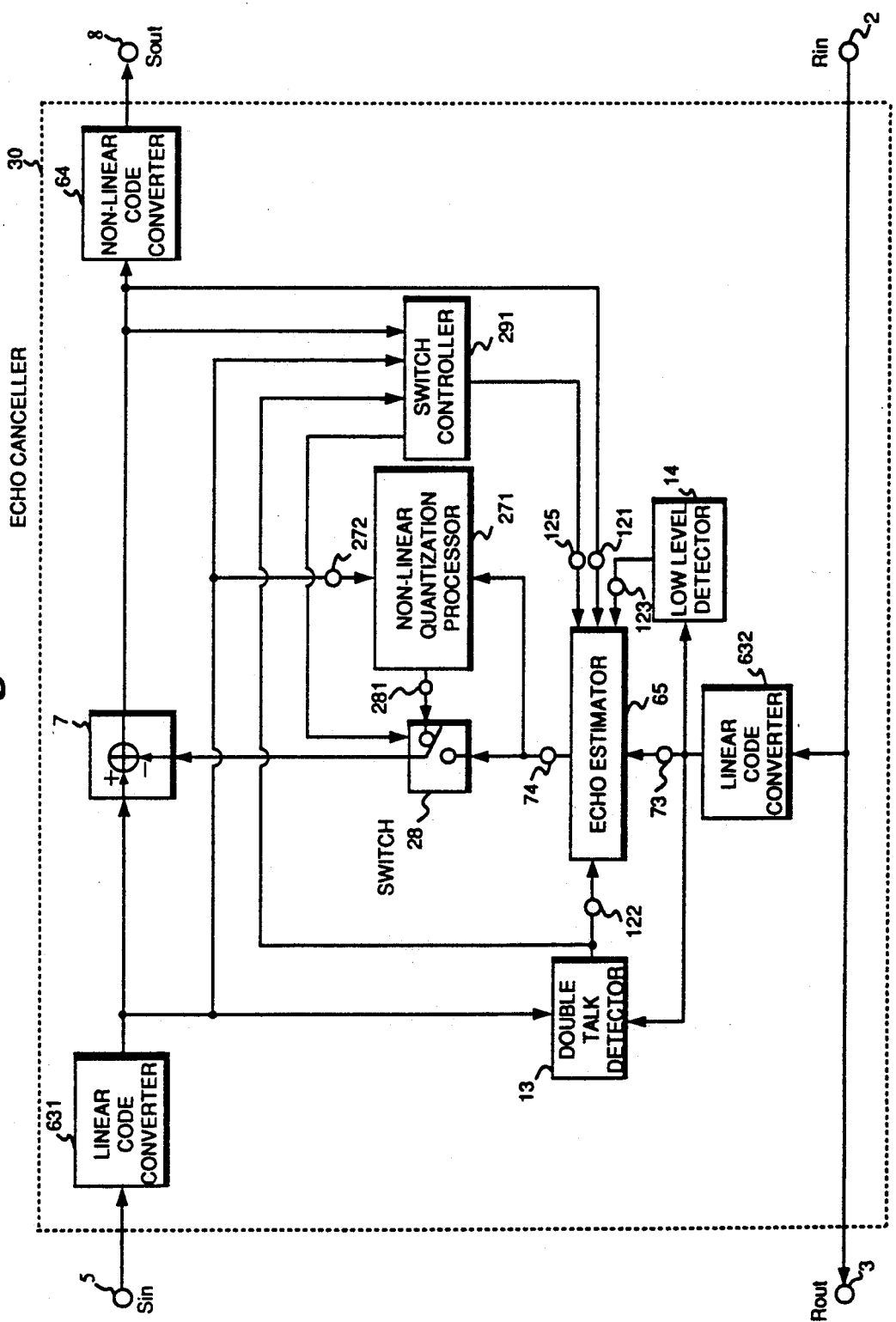
FIG. 5 is a functional configuration of an echo canceller (30) according to another embodiment of the present invention.

In a second embodiment of the present invention, an echo canceler (30) in FIG. 5 can be effectively applied to an echo path having not only a one link PCM channel but also a multi-linked PCM channel in which a large quantization noise exists. The echo canceler (30) in FIG. 5 has the same configuration as that of Embodiment 1 except for a non-linear quantization processor (271) and a switch controller (291). The non-linear quantization processor (271) provides an optimum echo estimate which gives a minimum level of the residual echo. In the switch controller (291), the convergence/divergence state of an echo estimator (65) is examined by comparing the levels of the linear transmit input signal and the residual echo with each other. When the level of the residual echo is smaller than that of the linear transmit input signal by at least a predetermined threshold, the non-linear processing mode is chosen when the convergent situation is achieved in the echo estimator (65), whereas the linear processing mode is chosen in the double talk situation, the low level situation for the linear receive input signal or the divergent situation in which the level of the residual is larger than that of the linear transmit input signal by at least a pre-determined threshold.

In the non-linear processing mode, the non-linear quantization processor (271) is inserted between the echo estimator (65) and a subtracter (7). In the linear processing mode, the non-linear quantization processor (271) is bypassed by controlling the switch (28) so as to connect the echo estimator (65) directly with the subtracter (7). When the double talk situation is detected, a double talk detector (13) outputs control signals for the echo estimator (65) and the switch controller (291). The switch controller (291) constrains the linear processing mode according to the control signal in the double talk situation.

Figure 6:
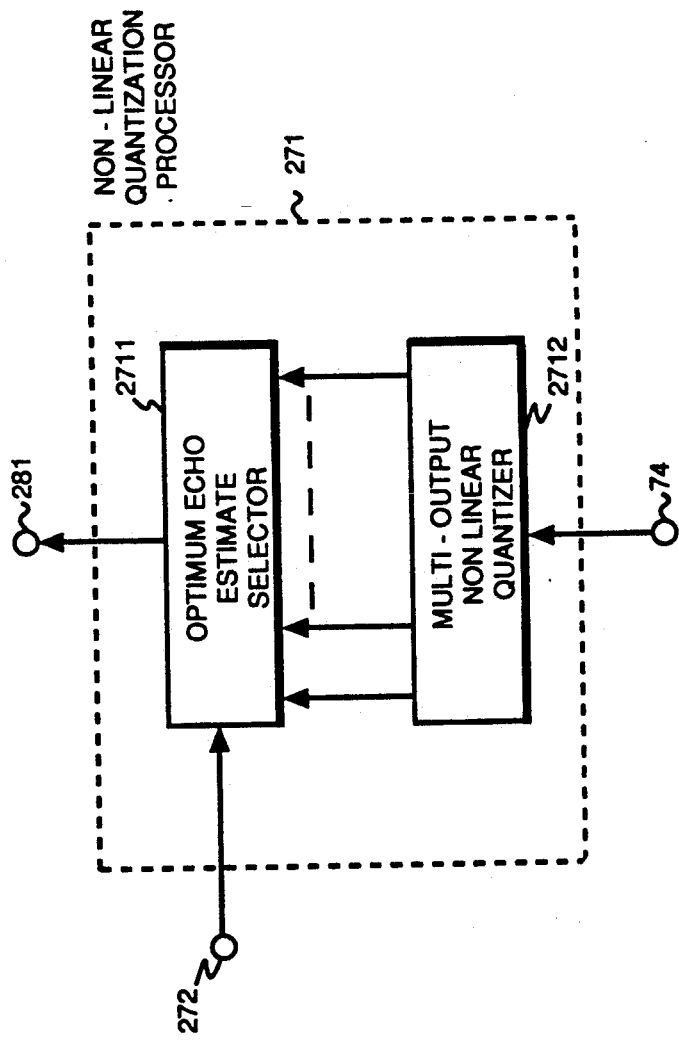
FIG. 6 is a functional configuration of a non-linear quantization processor (273) according to another embodiment of the present invention.

The configuration of the non-linear quantization processor (271) in this embodiment is given in FIG. 6. The non-linear quantization processor (271) has inputs of the linear transmit input signal through a port (272) and the echo estimate supplied by the echo estimator (65) through a port (74). An optimum echo estimate is derived as the output of the non-linear quantization processor (271) from a port (281) which is connected to the switch (28). The non-linear quantization processor (271) comprises a multi-output non-linear quantizer (2712) and an optimum echo estimate selector (2711). The multi-output non-linear quantizer (2712) provides a plurality of quantized echo estimates for the optimum echo estimate selector (2711) as candidates for an optimum echo estimate giving a minimum residual echo level. These candidates of quantized echo estimates include the quantized echo estimate directly corresponding to the echo estimate Es from the port (74) and also quantized echo estimates near to it. A typical example of the plurality of candidates, Ec(j), where j=1, . .

..., m, from the multi-output non-linear quantizer (2712), is given as follows;

$$Esq(k) = Q(Es), \quad [5]$$

$$\text{if } k < 1 + (m+1)/2, \ k = 1 + (m+1)/2, \quad [6]$$

$$\text{if } k > 256 - (m+1)/2, \ k = 256 - (m+1)/2, \quad [7]$$

$$Ec(j) = Esq\{k - (m+1)/2 + j\}, \quad [8]$$

where $Q(z)$ is the quantized output for the input z, k is the output level number of the quantizer corresponding to the echo estimate Es and $1 \leq k \leq 256$, $Esq(r)$ is the quantized output for level number of r, $Ec(j)$ is the j-th candidate, $1 \leq j \leq M$, and M is an odd number of candidates. In this example, quantization step sizes having a continuously distributed level number in the quantizer are allocated to the candidates.

In the optimum echo estimate selector (2711), the optimum echo estimate is chosen from the candidates as follows;

$$Ec(i) = \underset{j=1}{\overset{M}{\text{Min}}} \{|SinL - Ec(j)|; i\}, \quad [9]$$

$$Exopt = Ec(i), \quad [10]$$

where $Ec(i)$ is the i-th candidate giving the optimum echo estimate. The optimum echo estimate can provide the minimum level of the residual echo. The non-linear quantization processor (271) can search the optimum echo estimate from a greater number of candidates than that having only one candidate in the first embodiment.

During double talking, the control switch (291) constrains the switch (28) to bypass the non-linear quantization processor (271), as the near end talker's talkspurt is considerably affected by the non-linear quantization processor (271). The same procedures for the step gain in the echo estimator (65) are executed as those in the first embodiment in the double talk situation or the low level situation in the linear receive input signal. In the non-linear processing mode, the step gain can be set to a value larger than that in the first embodiment, as the non-linear quantization processor (271) can provide a wide range of candidates for completely cancelling both the echo and the quantization noise.

The echo canceler (30) can achieve a higher cancellation performance by introducing the non-linear quantization processor (271) in which an optimum echo estimate giving a minimum level of the residual echo is adaptively chosen from a plurality of candidates having a quantization noise which are derived from the echo estimate. This invention is very effective as an echo canceler for cancelling both echo and large quantization noise in the multi-linked PCM channels.

Embodiment 3

Figure 7:
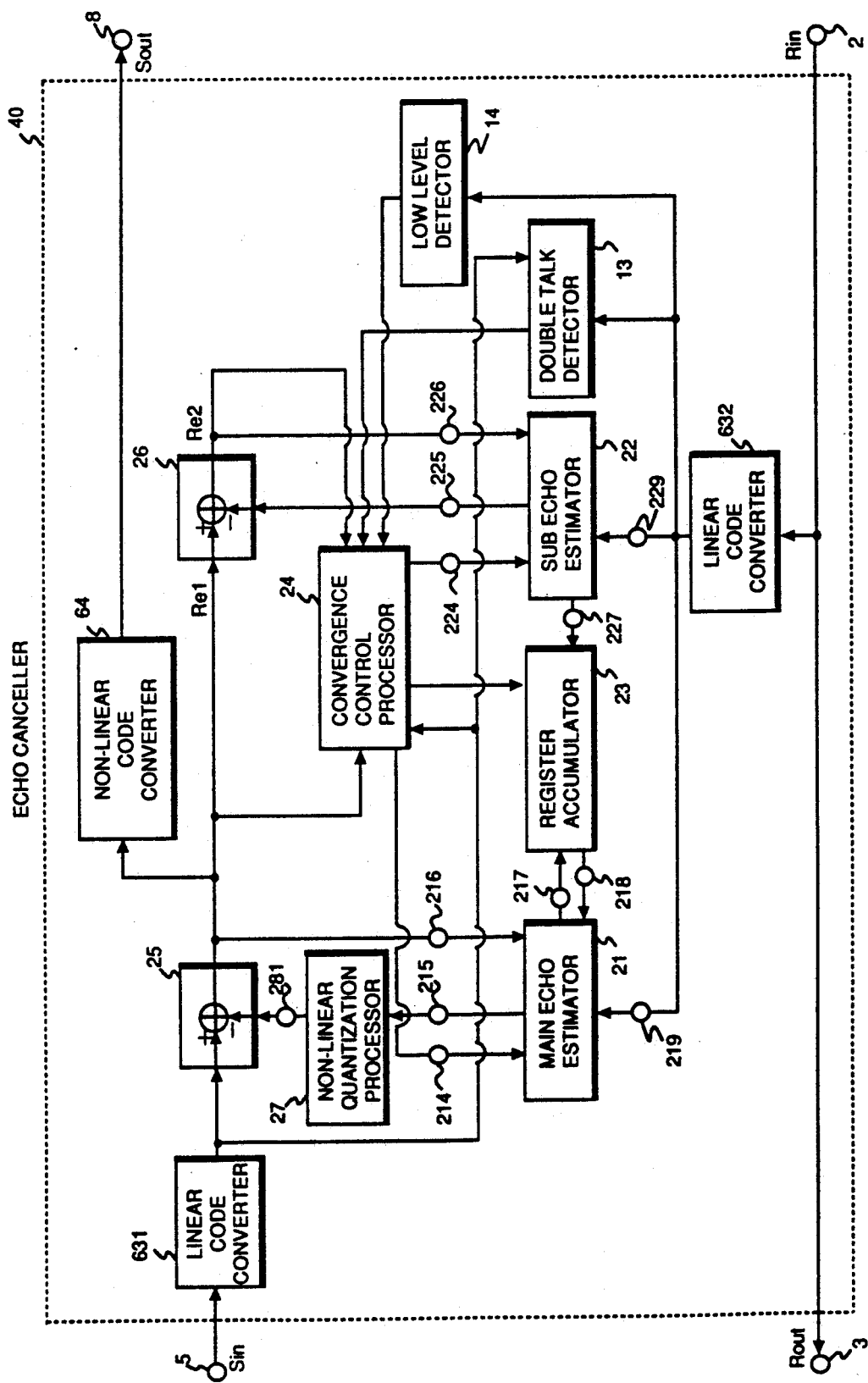
FIG. 7 is a functional configuration of an echo canceller (40) according to another embodiment of the present invention.

A conventional echo canceler having a plurality of echo estimators can provide excellent echo cancellation performance as described in U.S. patent application Ser. No. 848,781. But it cannot cancel the quantization noise in the linear transmit input signal due to the PCM channel. FIG. 7 shows the functional configuration of an echo canceler (40) according to a third embodiment of this present invention which can cancel the quantization noise. The echo canceler (40) comprises two echo estimators, that is, a main echo estimator (21) and a sub echo estimator (22). The same numerals as those in the preceding figures denote identical units. A non-linear quantization processor (27) having one quantized echo estimate is also inserted between a subtracter (25) and the main echo estimator (21). The main echo estimator (21) supplies a main echo estimate through a port (215) to a non-linear quantization processor (27) so as to generate a quantized echo estimate having a quantization noise directly corresponding to it as a new echo estimate. The subtracter (25) outputs a main residual echo by subtracting it at a first input of the subtracter (25) from the linear transmit input signal at a second input of the subtracter (25). The main residual echo is transmitted through a transmit output port (8) as a transmit output signal after converting it to a 8-bit PCM code through a non-linear code converter (64). The main residual echo may also be processed by a center clipper before the non-linear code converter (64).

The main residual echo is also supplied to a subtracter (26) so as to obtain a sub residual echo by subtracting a sub echo estimate from it. The sub echo estimate is derived from the sub echo estimator (22). When the level of the sub residual echo is smaller than that of the main residual echo by at least a given threshold, the sub echo estimator (22) is judged to be convergent in a convergence control processor (24). As a result, each filter coefficient stored in an H register of the sub echo estimator (22) is added to the related filter coefficient stored in an H register of the main echo estimator (21) in a register accumulator (23). After the coefficient addition, the H register of the sub echo estimator (22) is reset to an initial state, and then both echo estimators (21,22) are re-operated in the ordinary operation mode.

In the main echo estimator (21), a step gain having either a very small value or zero is used for coping with divergence due to double talking or channel noise disturbances, whereas a step gain having a relatively large value is applied in the sub echo estimator (22) so as to achieve rapid convergence. The addition of the coefficients can provide rapid convergence in the main echo estimator (21) even if a very small step gain is applied to it.

The non-linear quantization processor (27) is always inserted to provide a quantized value for the main echo estimate supplied by the main echo estimator (21). Because the step gain in the main echo estimate (21) has either zero or a very small value, it is not necessary to bypass the non-linear quantization processor (27) in the divergent situation in the main echo estimate as in the first embodiment.

This echo canceler (40) can maintain excellent performance under various conditions of large channel noise including quantization noise, for low levels of the receive input signal, during the initial stage for a hybrid circuit with a low ERL, at the front-end of talkspurt after double talking, and even during double talking.

The operation of the echo canceler (40) will now be described in detail. The functional configurations of these estimators (21,22) are the same as that of the echo estimator (6) in FIG. 2. The respective estimates are calculated through convolution circuits. One convolution circuit manipulates the linear receive input signal stored in the main X register and the filter coefficients stored in the main H register so as to generate the main echo estimate which is supplied to the non-linear quantization processor (274). The output of the subtracter (25) as a main residual echo Re1 is fed back to the main echo estimator (21) through a port (216) for updating the filter coefficients. The other convolution circuit manipulates the linear receive input signal stored in the sub X register and the filter coefficients stored in the sub H register of the sub echo estimator (22) so as to generate the sub echo estimate which is supplied to the subtracter (26) through a port (225). The output of the subtracter (26) as a sub residual echo Re2 is also fed back to the sub echo estimator (22) through a port (226) for updating the filter coefficients in the sub H register. The updating of the coefficients in the main and sub H registers is performed by using the linear receive input signal and the residual echo Re1, and by using the linear receive input signal and the residual echo Re2, respectively.

As mentioned above, three control modes are provided in the echo canceler (40), i.e. an ordinary mode, an adding mode and a reset mode. The non-linear quantization processor (27) is always inserted for these modes. In the convergence control processor (24), the mode is determined according to the situation of the sub echo estimator (22) by comparing the levels of the residual echoes Re1 and Re2 with reference to control signals from double talk and low level detectors (13,14), and the step gains are also chosen depending on the mode and the control signals from the double talk and low level detectors (13,14).

In the convergent situation in the sub echo estimator (22), the convergence control processor (24) outputs control signals to the register accumulator (23) and main and sub echo estimators (21,22) so as to add the filter coefficients in the sub echo estimator (22) from a port (227) on the related filter coefficients in the main echo estimator (21) from a port (217). The addition of the coefficients in the convergent sub H register to the related coefficients in the main H register is expressed by;

$$Hm(i)|n+1 = r1*Hm(i)|n + r2*Hs(i)|n, \quad [11]$$

where r1 and r2 are constants in the range of $0 \leq r1$ and $r2 \leq 1$, is the i-th tap position varying from 0 to $N-1$, $Hm(i)|n$ is the filter coefficient at the i-th tap in the main H register at the n-th sample index, and $Hs(i)|n$ is the filter coefficient at the i-th tap in the sub H register at the n-th sample index, respectively. After the addition, the sub H register in the sub echo estimator (22) is reset.

The added coefficients are replaced in the main H register of the main echo estimator (21) through a port (218). After performing these processes, both main and sub echo estimators (21,22) operate again in the ordinary mode for coefficient updating as does the echo estimator (6) in the conventional echo canceler (1).

When the sub echo estimator (22) is detected to be divergent by the convergence control processor (24), the mode becomes the reset mode, resulting in reset of the sub H register, and the mode is then switched to the ordinary mode. For other situations in the sub echo estimator (22), in which it is difficult to clearly judge whether the estimator is convergent or divergent, the same ordinary procedures are performed in the estimators (21,22) as in the conventional echo canceler (1).

The step gains provided in the main echo estimator (21) are relatively smaller than those in the sub echo estimator (22) so as not to cause the filter coefficients to diverge from the impulse response of the echo path even during double talking. On the other hand, a relatively large step gain is provided in the sub echo estimator (22) for achieving as rapid convergence for the echo as possible.

When the near- and far-end talkers are not in a double talk situation, the level of the sub residual echo Re2 rapidly becomes smaller than that of the main residual echo Re1 in the case of the main echo estimator (21) having an impulse response which deviates from that of the echo path, resulting in repetition of the adding mode.

After the addition at the n-th sample index, Re1 at the n+1-th sample index becomes;

$$Re1(n+1) = SinL(n+1) - \sum_{i=0}^{N-1} Hm(i)|n+1 * X(n+1-i), \quad [12]$$

$$= SinL(n+1) - \sum_{i=0}^{N-1} Hm(i)|n * X(n+1-i) - \quad [13]$$

$$\sum_{i=0}^{N-1} Hs(i)|n * X(n+1-i),$$

and tends roughly to Re2(n). This means that the main echo estimator (21) can converge rapidly by the addition process using the large step gain in the sub echo estimator (22), even though the step gain in the main echo estimator (21) is very small.

When the double talk situation or a low level of the linear receive input signal is detected, the step gain is changed from a very small value to 0 in the main echo estimator (21) according to the control signals from the convergence control processor (24).

At the beginning of double talking, the filter coefficients in the sub echo estimator (22) are abruptly corrupted and cause to deviate due to the large step gain before the double talk detector (13) detects the double talk situation, and the divergence causes rapid increase of the sub residual echo Re2. However, there is no effect on the performance of the main echo estimator (21), because the very small step gain can prevent the coefficients from diverging in the main echo estimator (21), and the rapid detection of the divergent state of the sub echo estimator (22) by the convergence control processor (24) can also prohibit the coefficient addition. The sub echo estimator (22) is only reset to release the divergent coefficients. A stable main echo estimator (21) having a step gain of zero or a small value can always result in a suitable new echo estimate supplied by the non-linear echo quantization processor (27).

During the activation of the low level detector (14), the addition process can be performed whenever the adding mode is chosen.

The present echo canceler (40) is hardly affected at the front-end portion of double talking, during double talking and in the presence of the channel noise by setting the step gain to either zero or a very small value and by prohibiting the coefficient addition, whereas the echo estimator (6) in the conventional echo canceler (1) becomes divergent due to the relatively large step gain required to achieve reasonable convergence.

The conventional echo canceler (1) also cannot provide good performance for a linear receive input signal having a low level, because a relatively high threshold in the low level detector (14) is set to avoid divergence by sacrificing rapid convergence for successive low level talkspurts having a different frequency spectrum. However, the echo canceler (40) can perform well even for such low levels of the receive input signal. The step gain of either zero or a very small value makes the main echo estimator (21) and the non-linear quantization processor (27) very robust to such disturbances, maintaining rapid convergence by the addition process.

The echo canceler (40) comprising main and sub echo estimators (21,22) having the coefficient addition process and the non-linear quantization processor (27) can achieve better cancellation performance than the previous echo canceler (1) with regard not only to echo return loss enhancement but also to convergence speed and cancellation of quantization noise as described above.

Embodiment 4

Figure 8:
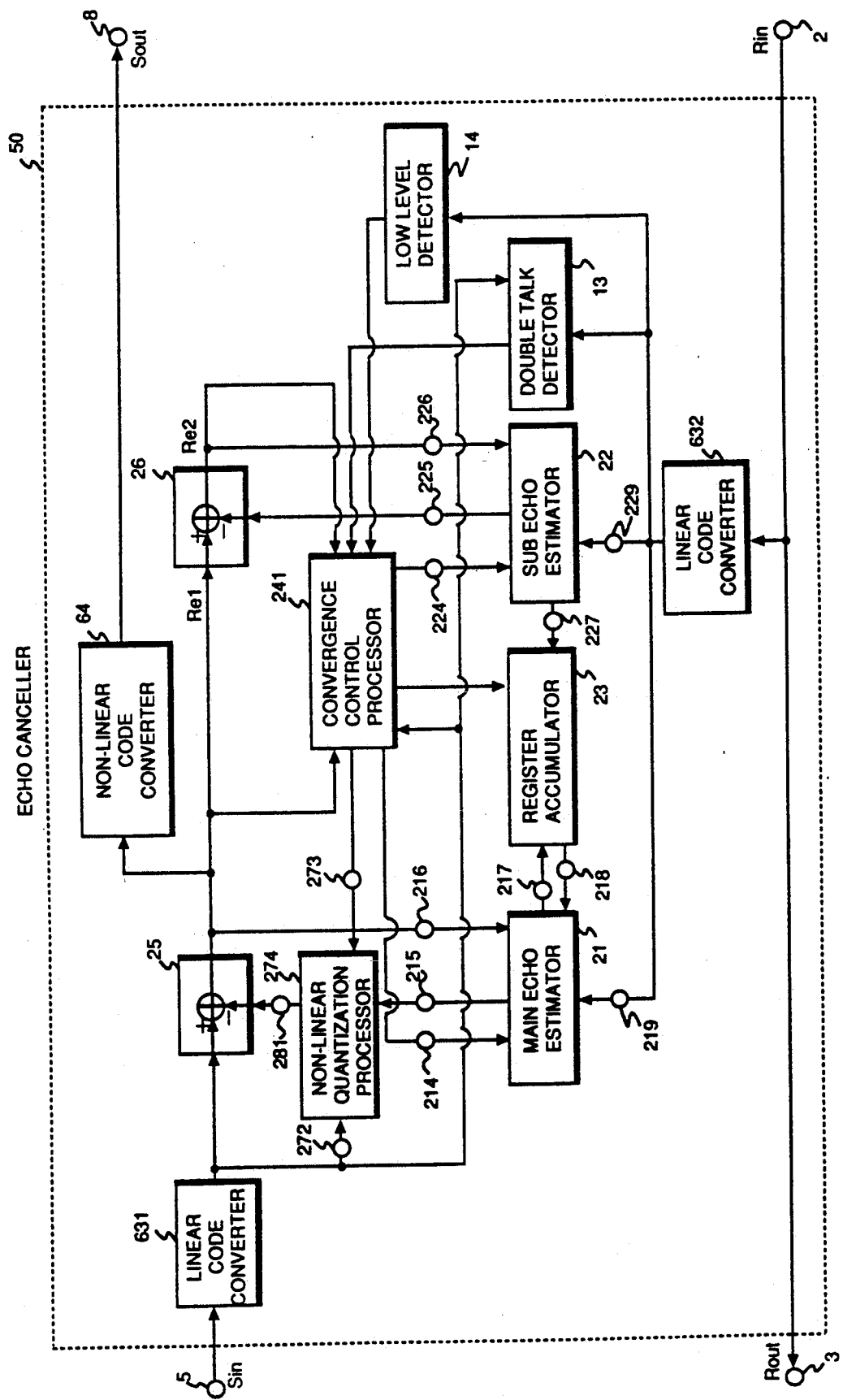
FIG. 8 is a functional configuration of an echo canceller (50) according to another embodiment of the present invention.

In a fourth embodiment of the present invention, an echo canceler (50) shown in FIG. 8 is applied to an echo path having a multi-linked PCM channel in which a large quantization noise exists. The same numerals as those in the preceding figures denote identical units. The same units are used in this embodiment except for a non-linear quantization processor (274) and a convergence control processor (241). The non-linear quantization processor (274) provides an optimum echo estimate which gives a minimum level of a main residual echo.

The main echo estimator (21) supplies a main echo estimate through a port (215) to the non-linear quantization processor (274) so as to produce an optimum echo estimate based on it. A subtracter (25) provides the main residual echo which is transmitted through a transmit output port (8) as a transmit output signal after converting it to an 8-bit PCM code in a non-linear code converter (64). The main residual echo may also be processed by a center clipper before the non-linear code converter (64).

Figure 9:
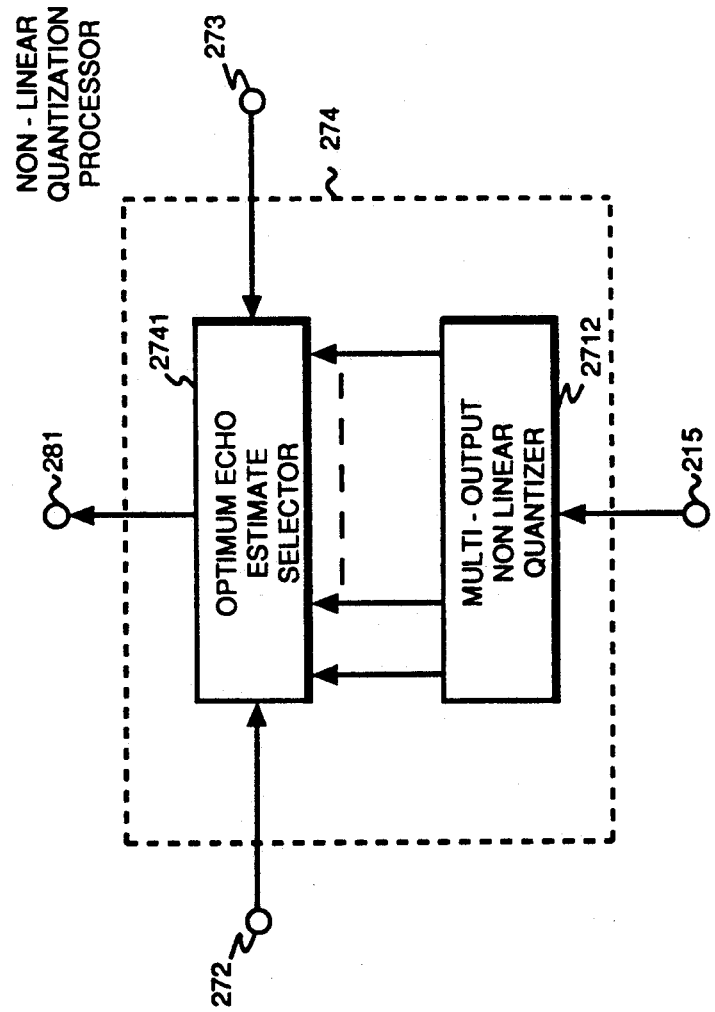
FIG. 9 is a functional configuration of a non-linear quantization processor (274) according to another embodiment of the present invention.

The configuration of the non-linear quantization processor (274) which provides the optimum echo estimate is shown in FIG. 9. The processor (274) comprises the same multi-output non-linear quantizer (2712) as that in FIG. 6 and an optimum echo estimate selector (2741). The optimum echo estimate selector (2741) has input ports (271) and (273) for a linear transmit input signal and a control signal from the convergence control processor (241), respectively. The candidates derived from the main echo estimate given by [8] are supplied to the optimum echo estimate selector (2741). The optimum echo estimate Esopt which gives a minimum level of the main residual echo is determined by [9] and [10] except during double talking. In the double talk situation, it is necessary to avoid the near-end talkspurt annoying due to the non-linear quantization processor (274). Accordingly, the convergence control processor (241) gives a control signal through the port (273) to the optimum echo estimate selector (2741) in order to limit the quantized echo estimate directly corresponding to the main echo estimate as the optimum echo estimate. The convergence control processor (241) performs the same procedure as the convergence control processor (24) does in FIG. 7 except for providing the control signal for the non-linear quantization processor (274) during double talking as described above.

This echo canceler (50) can also provide excellent and stable performance and rapid convergence in both echo and quantization noise cancellation under various conditions of large channel noise including multi-linked PCM quantization noise, for low levels of the receive input signal, during the initial stage for a hybrid circuit with a low ERL, at the front end of talkspurt after double talking, and even during double talking.

This invention is also applicable to other configurations described in U.S. patent application Ser. No. 848,781 having a plurality of echo estimators.

The advantages of the present invention will now be summarized.

(1) In an echo canceler according to the present invention having a non-linear quantization processor (27), wherein a small step gain provides an accurate echo estimate in the convergent situation of an echo estimator (65), a non-linear quantization processor (27) generates a new echo estimate having a quantization noise corresponding to the echo estimate supplied by the echo estimator (65). The new echo estimate can suppress not only the echo but also the quantization noise in a linear transmit input signal caused by PCM interfaces with a PCM channel. This simple configuration can provide an excellent echo return loss enhancement including a quantization noise cancellation, which cannot be achieved in a conventional echo canceler.

(2) By using a non-linear quantization processor (271,274) in which an optimum echo estimate giving a minimum level of the residual echo can be chosen widely from a plurality of candidates based on the echo estimate derived from the echo estimator (65,21), both the echo and the large quantization noise in an echo path having multi-linked PCM channels can be drastically suppressed in the echo canceler (30), providing an excellent and stable echo return loss enhancement.

(3) Echo cancelers (40,50) according to the present invention using a plurality of echo estimators, wherein the addition process for filter coefficients between the echo estimators and the process of non-linear quantization processors (27,274) are performed, can provide excellent performance of both echo and quantization noise cancellation with rapid convergence and robustness to double talking and channel noise disturbances including quantization noise.

(4) The echo canceler (50) according to the present invention can maintain high cancellation performance even for low levels of the linear receive input signal. This is due to the fact that a main echo estimator having a small step gain is very stable and can be made to converge very rapidly by the addition process even for low level receive input signals, and the fact that the non-linear quantization processor (274) which provides an optimum echo estimate giving a minimum level of the main residual echo can dramatically eliminate the quantization noise.

The present invention is applicable, for instance, to echo cancelers having PCM interfaces for telephone channels including PSTN, ISDN and mobile communication networks, echo cancelers for hand free telephones and for tele-conference equipment including TV phone, TV conference and audio conference devices.

From the foregoing, it will be apparent that the present invention constitutes a new and improved echo canceller. It should be understood of course that the embodiments disclosed are merely illustrative and are not intended to limit the scope of the invention. Reference should be made to the appended claims, therefore, rather than the specification as indicating the scope of the invention.

What is claimed is:

1. An echo canceller inserted in a four-wire circuit for cancelling an echo component in a transmit path comprising;

a subtracter (7) inserted in said transmit path for subtracting an echo estimate at a first input of said subtracter (7) from a linear transmit input signal at a second input of said subtracter (7) so as to provide a residual echo at an output of said subtracter (7) which is a linear transmit output signal, an echo estimator (65) coupled with a receive path for synthesizing an echo estimate as an output from a linear receive input signal in said receive path by using an adaptive digital filter in said echo estimator (65), filter coefficients of said adaptive digital filter are updated according to said residual echo at said output of said subtracter (7) and said linear receive input signal in said receive path, wherein the improvements comprise in;

a non-linear quantization processor (27) coupled with said echo estimator (65) for providing an output which is a quantized echo estimate corresponding to said echo estimate supplied by said echo estimator (65), a switch (28) for switching said echo estimate at the first input of said subtracter (7) between said output of said echo estimator (65) and said quantized output provided by said non-linear quantization processor (27), a switch controller (29) for controlling said switch (28), wherein said switch controller (29) causes said switch (28) to connect said output of said echo estimator (65) to the first input of said subtracter (7) in a divergent situation of said echo estimator (65), wherein said switch controller (29) causes said switch (28) to connect said output of said non-linear quantization processor (27) to the first input of said subtracter (7) in a convergent situation of said echo estimator (65), wherein said convergent situation is defined so that the output level of said subtracter (7) is lower than the level of said linear transmit input signal by at least a given threshold.

2. An echo canceller according to claim 1, wherein said non-linear quantization processor (271) comprises a multi-output non-linear quantizer (2712), which outputs a plurality of quantized echo estimates as candidates based on said echo estimate from said echo estimator (65), and an optimum echo estimate selector (2711) which provides an optimum echo estimate as an output of said non-linear quantization processor (271), said optimum echo estimate selector (2711) chooses said optimum echo estimate from said candidates supplied by said multi-output non-linear quantizer (2712) by comparing each of them with said linear transmit input signal so as to provide a minimum level of said residual echo, a double talk detector (13) coupled with said receive path is provided to detect a double talk situation between near-end and far-end talkers and to inform said switch controller (291) of the double talk situation, and said switch controller (291) causes said switch (28) to connect said echo estimator (65) to said subtracter (7) in the double talk situation.

3. An echo canceller inserted in a four-wire circuit for cancelling an echo component in a transmit path comprising;

a subtracter (25) inserted in said transmit path for subtracting an echo estimate at a first input of said subtracter (25) from a linear transmit input signal at a second input of said subtracter (25) so as to provide a main residual echo at an output of said subtracter (25) which is a linear transmit output signal, a main echo estimator (21) coupled with a receive path for synthesizing a main echo estimate as an output from a linear receive input signal in said receive path by using an adaptive digital filter in said main echo estimator (21), filter coefficients of said adaptive digital filter in said main echo estimator (21) are updated according to said main residual echo at said output of said subtracter (25) and said linear receive input signal, a subtracter (26) coupled with said subtracter (25) for subtracting a sub echo estimate from said main residual echo to output a sub residual echo, a sub echo estimator (22) coupled with said receive path for synthesizing said sub echo estimate as an output from said linear receive input signal in said receive path by using an adaptive digital filter in said sub echo estimator (22), filter coefficients of said adaptive digital filter in said sub echo estimator (22) are updated according to said sub residual echo at said output of said subtracter (26) and said linear receive input signal, a convergence control processor (24) for controlling said main echo estimator (21), said sub echo estimator (22) and a register accumulator (23) according to a convergence/divergence state of said sub echo estimator (22), said register accumulator (23) for adding filter coefficients in said sub echo estimator (22) to filter coefficients corresponding to the same tap positions in said main echo estimator (21) according to the control by said convergence control processor (24), wherein the improvements comprise in;

a non-linear quantization processor (27) coupled with said main echo estimator (21) for providing said echo estimate at the first input of said subtracter (25) which is a quantized echo estimate for said main echo estimate supplied by said main echo estimator (21), wherein said convergence control processor (24) chooses an operation mode from an ordinary mode, an adding mode, or a reset mode according to the convergence/divergence state of said sub echo estimator (22) determined by a level comparison of at least said main and sub residual echoes, said adding mode is chosen in the convergent situation of said sub echo estimator (22) wherein the level of said sub residual echo is smaller than that of said main residual echo by at least a given threshold, said reset mode is chosen in a divergent situation of said sub echo estimator (22) wherein the level of said sub residual echo is larger than that of said main residual echo by at least a given threshold, and said ordinary mode is chosen in the other situation in which said sub echo estimator (22) does not converge or diverge clearly.

4. An echo canceller according to claim 3, wherein said non-linear quantization processor (274) comprises a multi-output non-linear quantizer (2712) which outputs a plurality of quantized echo estimates as candidates based on said main echo estimate from said main echo estimator (21), and an optimum echo estimate selector (2741) which provides an optimum echo estimate as an output of said non-linear quantization processor (274), said optimum echo estimate selector (2741) chooses said optimum echo estimate from said candidates supplied by said multi-output non-linear quantizer (2721) by comparing each of them with said linear transmit input signal so as to provide a minimum level of said main residual echo, a double talk detector (13) coupled with said receive path is provided to detect a double talk situation between near-end and far-end talkers and to inform said convergence control processor of the double talk situation, said convergence control processor causes said non-linear quantization processor (274) to output a quantized echo estimate corresponding to said main echo estimate supplied by said main echo estimator (21), said quantized echo estimate is equal to said echo estimate at the first input of said subtracter (25) in said double talking situation.

5. An echo canceller according to claims 1 or 2, wherein a double talk detector (13) and/or a low level detector (14) for said linear receive input signal are provided for controlling a step gain in said echo estimator (65,21,22).

6. An echo canceller according to any one of claims 1-4, wherein a center clipper is provided for clipping said residual echo or said main residual echo when it has a small level.

7. An echo canceller according to claims 3 or 4, wherein a double talk detector and/or a low level detector for said linear receive input signal are provided for controlling a step gain in said main echo estimator and said sub echo estimator.

* * * * *